Nov. 12, 1940.    J. H. SAUERESSIG    2,221,007
DEVICE FOR PRODUCING A SOUND TRACK
Filed May 17, 1939
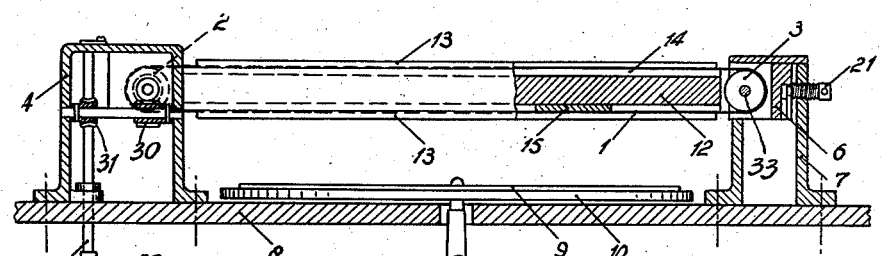
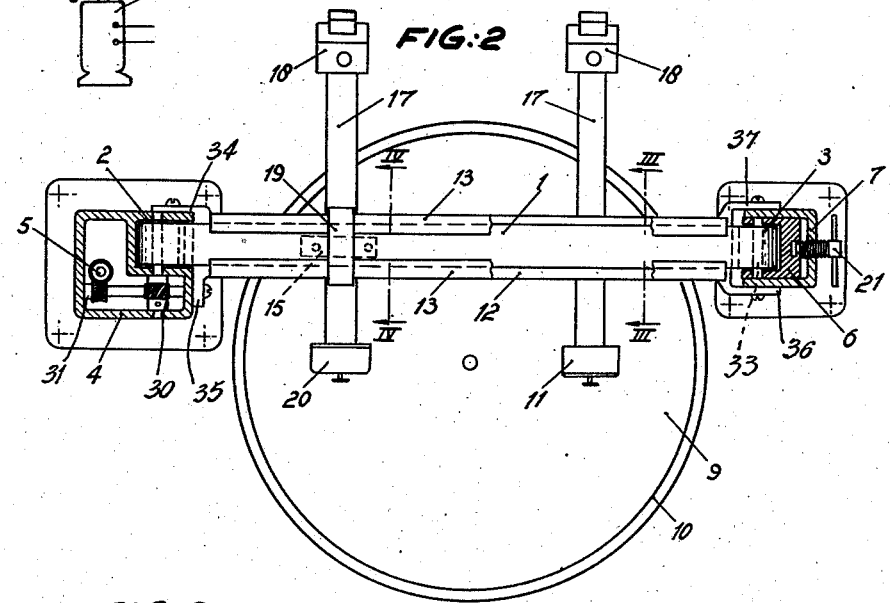
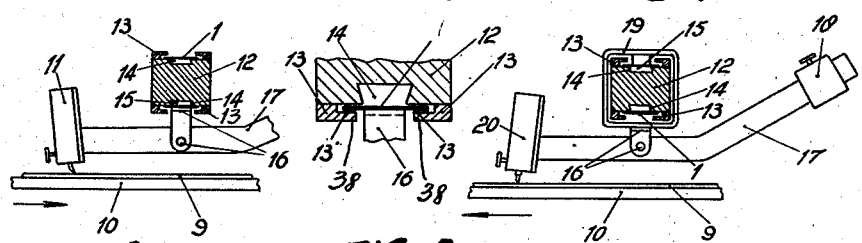
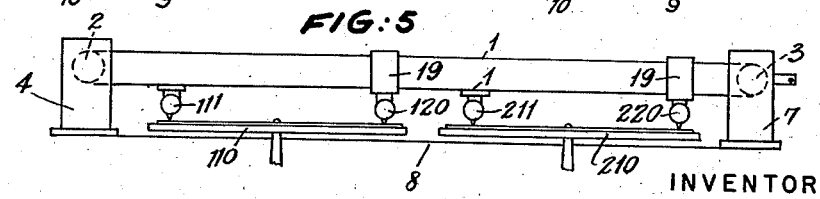
INVENTOR:
Johann Heinrich SAUERESSIG
BY
ATTORNEY Patented Nov. 12, 1940

2,221,007

UNITED STATES PATENT OFFICE 2,221,007

DEVICE FOR PRODUCING A SOUND TRACK

Johann Heinrich Saueressig, Enschede, Netherlands, assignor to V. G. Manufacturing Company Ltd., London, England, a British company Application May 17, 1939, Serial No. 274,183
In the Netherlands May 21, 1938

10 Claims. (Cl. 274—13)

This invention relates to a device for producing a sound track in plane or cylindrical blanks, and more particularly to a device for cutting gramophone records.

The object of the invention is to provide tracking means for the cutting head which is considerably cheaper and more efficient than those at present in use and with this object in view tracking of the head is effected by means of an endless flexible traversing element. Thus the screw spindle usually employed for tracking the cutting head is unnecessary and uniform movement is obtained at small cost, which is of considerable importance in the production of gramophone record discs of large diameter.

Preferably, the conveying element comprises a steel band which is guided over smooth-faced pulleys made, for example, of steel and the drive is preferably effected by means of a simple or multiple worm gear, which is of particular advantage to the uniformity of movement.

The conveying element according to the invention may be arranged to control only the conveying movement of the cutting head, or it may be so designed that it serves simultaneously the purpose of preventing undesirable movement of the cutting head perpendicular or parallel to the surface to be cut. This control of the position of the cutting head and stylus with respect to the surface to be cut may thus be effected either by means of separate auxiliary elements, for example, a separate guide for the cutting head or by means of the flexible conveying element. The latter design has the advantage of simplifying the construction, and in order to adapt the invention for operation in this manner the flexible conveying element itself or a part attached thereto, according to the invention may be moved by means of a guide. The guide in this case prevents movement on the part of the traversing element other than in its longitudinal direction.

For this purpose, according to a further feature of the invention, use is made of a stationary bar arranged parallel to a portion of the conveying element, said bar being provided with means for guiding the conveying element. The use of a bar of this kind in combination with the endless conveyer band results in an important advantage, namely, that the band may be used for keeping dust and other impurities away from the guiding means. This is not possible where tracking is effected by means of a screw spindle.

The invention also contemplates the provision of a stationary bar arranged between the two parallel sides, upper side and lower side, of the endless band and provided on both sides with guiding means.

The invention will now be described with reference to a constructional form illustrated by way of example in the accompanying drawing, and intended for the cutting of gramophone record discs. In said drawing:

Figure 1 illustrates a vertical section of a device according to the invention.

Figure 2 illustrates the same device partly in plan view and partly in horizontal section.

Figures 3 and 3a are detail views, the former being a vertical section on the line III—III in Figure 2.

Figure 4 is a vertical section on the line IV—IV in Figure 2.

Figure 5 is a diagrammatic view showing a particular use of the invention.

In Figures 1–4 the endless, flexible conveying element consists of an endless band 1 passing around two pulleys 2 and 3. Pulley 2 is driven by means of a double worm gear 30, 31 arranged within a standard 4. A drive shaft 5 may be operated, for example, by means of an electric motor 32.

The pulleys 2 and 3 are smooth-faced and are formed preferably of steel. The band 1 may be held under tension about the pulleys 2 and 3 by mounting the spindle 33 of the pulley 3 in a U-shaped slide piece 6 within a standard 7 which, the same as standard 4 supporting the pulley 2, is secured to a baseplate 8. The position of the slide piece 6 and consequently the tension on the band 1 is controlled by a tensioning device 21 supported in the standard 7 and connected to the slide piece. As shown in Figure 2 both the slide piece 6 and the upper adjacent part of the housing are of U-shaped cross-section.

The endless band conveys the sound box for recording sound or the cutting head across the blank when the cutting head is operated to cut a track in a disc-shaped blank 9 supported on a rotatable record carrier or turntable 10. In the constructional form illustrated in the drawing, the band 1 not only guides the cutting head but also serves to determine the position of the head with respect to the blank 9. However, as already mentioned above this double function of the band 1 is not obligatory.

Figure 3 illustrates the manner in which the cutting head is guided and its position with respect to the blank 9 is fixed, the cutting head being in this figure designated by the numeral 11.

Between the two parallel portions of the band 1 there is arranged a stationary guide bar 12, which is provided in each of its upper and lower surfaces with a longitudinally extending trapezoidal recess 14. A block 15, which is secured to the band 1 at a particular point and has the same trapezoidal cross section as the recess 14, is adapted to slide in said recess. At the same position on the band 1 but projecting from the opposite face thereof is a support 16, the arrangement being such that the band lies between the block and the upper end of the support and slide block thus forming the sound box carriage. This carriage carries a double armed lever 17 pivotally connected to the lower end of support 16. One arm carries the cutting head 11 and the other arm a counterweight 18.

The trapezoidal cross section of the recess 14 and of the block is of course not essential, and the same effect can be obtained by means of a cooperating groove and block of other cross sections enlarging from the mouth of the groove.

The arrangement as described has the further advantage that the band 1 is arranged to cover and thus protect the recess 14 and the block moving therein from being soiled by dust or other extraneous matter and thus increases the reliability of the action and the uniformity of movement of the traversing element. For further protection against dust, as may be seen in Figures 3 and 3a, strips 13 are provided at the edges of the upper and lower faces of guide bar 12, the inner flanges or edges 38 of said strips being spaced apart from the guide bar and the gaps formed thereby being closed by means of linings 13' of plush, velvet or equivalent material.

The device functions in the following manner:

When the band 1 is moved by rotation of the pulley 2 it carries along with it the sound box carriage, block 15 and support 16, as well as the sound box or cutting head 11 for recording sound supported by the sound box carriage. The cross sectional form of the recess 14 and the block prevents any vertical or lateral movement of the band with the result that the position of support 16, cutting head 11 and counterweight 18 with respect to the record blank 9 is perfectly determined.

Although the slide block 15 is shown in Figure 1, the other parts of the apparatus illustrated in Figure 3 have been omitted. Nevertheless, it will readily be understood from Figure 1 that when the band 1 moves, either from left to right or from right to left according to the direction of movement of the band, the cutting head is moved correspondingly, passing over the blank and cutting the sound track therein.

Owing to the uniform movement obtained with the aid of the conveying mechanism described, sound track grooves can be cut in the blank with very narrow shoulders or bands between them. It has been found in practice that seven grooves and upwards per millimetre can easily be produced. The uniformity of the movement is assisted by the use of the worm gear within the standard 4 as well as by the means above described for guiding the band.

By operation of the tensioning device 21 the tension on the band 1 can be removed and movement of the band arrested when the cutting head 11 has completed the cutting of the sound track. Furthermore, the cutting head may then be returned by hand to its original or to any other desired position.

Figure 2 is a plan view of Figure 1, the cutting head 11 and the rod 17 being shown on the right hand side of the figure. As will be seen the cutting head 11 is guided exactly radially over the blank 9.

The stationary guide bar 12 is arranged between the two parallel portions of the band 1, and, as illustrated in Figures 1 and 2, attached at one end to standard 4 and at the other end to standard 7 by means of bifurcated end pieces 34, 35 and 36, 37, respectively.

Support 16 may either, as shown in Figure 3, be attached to the lower side of the band 1, or as illustrated in Figure 4, to a loop 19 embracing guide bar 12 and secured to the upper side of said band 1 above guide bar 14. Otherwise the arrangement is the same as in Figure 3.

The possibility of deriving a movement both from the lower as well as from the upper side of the band 1 affords the following advantage in the device according to the invention. It will be seen from Figure 2 that the lower side, for example, of the band 1 may move a sound box 11 for cutting a sound track into the blank whilst the upper side of the band 1 moves a soundbox 20 for reproducing sound from the track. Said soundbox 20 in this case moves in a direction opposite to the direction of the cutting head 11, and the result is that by this means the record can be reproduced almost immediately after the sound track has been cut. When the soundbox 11 for recording sound and the soundbox 20 for reproducing sound are arranged upon the band 1 in an appropriate manner with respect to each other, i. e. oppositely and symmetrically to each other and the axis of the turntable, it is always ensured that they run in the same soundtrack and that guiding or tracking of the soundbox need not be effected by means of the record. In this manner wear of the groove is avoided as much as possible during reproduction which latter is mostly carried out for the purpose of checking the record. At the same time the soundbox for recording sound and the soundbox for reproducing sound will be returned to corresponding new positions simultaneously when the cutting head is displaced after the tension on the band has been released to stop its movement.

When the device according to the invention is constructed, as shown in Figure 2, with both a cutting head or a soundbox 11 for recording sound and a soundbox 20 for reproducing sound, the guide bar 12 is provided both above and below with a recess 14 and, if desired, with strips 13; this is the assumption upon which Figures 1 to 4 are based. This construction is, however, not absolutely necessary. With the arrangement as illustrated in Figure 3 the upper recess 14 and the upper strips 13 may be omitted, and for the purposes of attachment according to Figure 4 the reverse holds good. Nor is it absolutely necessary that the guide bar 12 be located between the two runs of the band 1. It may in fact be located above the upper run or below the lower run thereof. Finally, it is not essential that the band shall run over only two pulleys.

Figure 5 illustrates diagrammatically another arrangement for cutting sound records utilizing the flexible endless traversing band. The band in this case may be of such length that it extends over a plurality of turntables, for instance 110 and 210, or otherwise shaped supports or carriers on which the blanks to be cut are supported. In this case a plurality of sound boxes 111 and 211 for recording sound or cutting the sound tracks and, if desired, of soundboxes 120 and 220 for reproducing sound, can then be arranged upon the band so as to afford the possibility of recording on and/or reproducing from a plurality of records without interruption. This possibility is of importance for the recording of lengthy musical recitals, lectures etc. as well as for the simultaneous production of several records, or for the reproduction of a record simultaneously with the recording of one or more other records.

What I claim is:

1. In a sound recording or reproducing device, the combination with a base, a rotatable record carrier, spaced standards secured to said base, an endless flexible conveyer band, said standards having means for rotatably mounting said conveyer band thereabout and for extending said conveyer band between said standards, of a sound box carriage permanently secured to said conveyer band, a guide bar supported by said standards, said guide bar provided at its side facing the conveyer band with a groove of a cross section enlarged from the mouth of said groove, a slide block of a cross section shaped in accordance with said guide groove associated with said sound box carriage and permanently secured to said conveyer band.

2. In a sound recording or reproducing device, the combination with a base, a rotatable record carrier, spaced standards secured to said base, an endless flexible conveyer band, said standards having means for rotatably mounting said conveyer band thereabout and for extending said conveyer band between said standards, of a sound box carriage permanently secured to said conveyer band, of a stationary guide bar arranged within the loop of said endless conveyer band and provided at either of its sides facing said conveyer band with a guide groove for at least one slide block received in either of said guide grooves and permanently secured to said endless conveyer band.

3. In a sound recording or reproducing device, the combination of a base, a rotatable record carrier, spaced standards secured to said base laterally and on opposite sides of said record carrier, each standard provided with a pulley, an endless conveyer band extended between and about said pulleys and bridging said rotatable record carrier, a stationary guide bar extended between said standards, means for operatively connecting said guide bar and said conveyer band, a drive for said conveyer band, and a sound box carriage secured to said conveyer band.

4. In a device as set forth in claim 3, the upper side of said conveyer band and the lower side of said conveyer band both provided with a sound box carriage each and secured thereto, said upper band side carriage and said lower band side carriage oppositely arranged with regard to each other and symmetrically to the axis of said rotatable record carrier.

5. In a device as set forth in claim 3, said guide bar arranged within and along the loop of said endless conveyer band and secured to said standards.

6. In a device as set forth in claim 3, the upper side of said conveyer band and the lower side of said conveyer band both provided with a sound box carriage each, said carriages oppositely arranged with regard to each other and symmetrically to the axis of said rotatable record carrier, the one of said sound box carriages adapted to carry a sound box for recording sound upon, the other for reproducing sound from, one and the same sound record simultaneously.

7. In a device as set forth in claim 3, said combination including two sound boxes, said conveyer band adapted to convey by means of its upper side and by means of its lower side one of said two sound boxes each, symmetrically and oppositely with regard to each other on opposite halves of a sound record base respectively, one of said sound boxes for recording sound upon, the other for reproducing sound from a sound record.

8. In a device as set forth in claim 3, said combination including a plurality of sound record carriers, said conveyer band allotted to said plurality of sound record carriers in common and extended thereacross, a plurality of sound boxes associated with said conveyer band adapted to record sound upon, and reproduce sound from a plurality of sound records, simultaneously.

9. A device as set forth in claim 1 wherein said endless flexible conveyer band is arranged to cover said guide groove by means of its side facing said guide bar.

10. A device as set forth in claim 2 wherein said endless flexible conveyer band is arranged to cover said guide groove on either side of said guide bar.

JOHANN HEINRICH SAUERESSIG.